INVENTOR.
HENRY H. CLINTON

BY McCormick, Paulding & Huber
ATTORNEYS

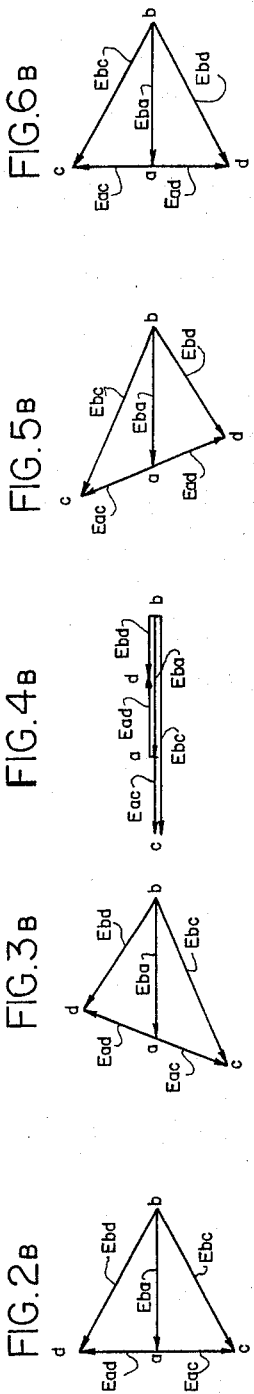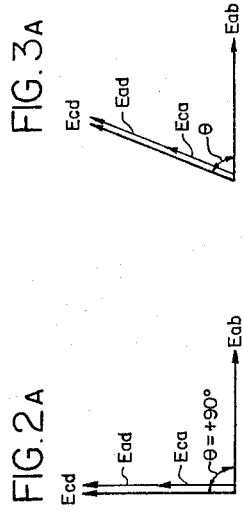

United States Patent Office 3,286,130
Patented Nov. 15, 1966

3,286,130
RESISTIVE CURRENT SENSING DEVICE
Henry H. Clinton, Ridgewood, Clinton, Conn.
Filed Jan. 7, 1963, Ser. No. 249,735
14 Claims. (Cl. 317—27)

This invention relates to an electrical current sensing device and deals more particularly with such a device which is responsive in general only to the resistance component, and not to the reactance component, of the current flowing through a given circuit as a result of an applied alternating voltage.

The device of the present invention has many varied and different uses, but for the purpose of illustration it is described herein as applied to the testing of the insulation applied to electrical conductors. In one form of insulation testing, the conductor after being wound on a reel or spool is immersed in a body of water or other conducting liquid and a high alternating voltage is applied between the conductor and the water. If the insulation of the conductor is good, a small current will flow to the test specimen. If the insulation fails a greater amount of current will flow. The resistance of the insulation produces a current component which is in phase with the applied alternating voltage, but also included in the total current is a capacitive reactance component, produced by the capacitance between the conductor and the water, which is 90 degrees out of phase with the resistance component and which may vary in size depending on various factors such as the nature and location of any weakness in the insulation and the length of the conductor on the reel or spool. It is therefore desirable that only the resistance component of the current be measured, as this component represents more correctly the character of the insulation than does the total current. The same situation is present in the testing of multiconductor transmission lines wherein an alternating voltage is applied across two of the conductors. The resistance component of the current produced indicates the resistance of the insulation between the two conductors, but included in the total current is a capacitive reactant component which may vary from specimen to specimen and which must therefore be separated from the resistance component to allow a correct measurement of the insulation properties.

The general object of this invention is therefore to provide a current sensing device adapted for use in a circuit having an alternating current flowing therethrough which may lead or lag the applied voltage and which device is responsive to only the resistance component of the total current.

A further object of this invention is to provide a current overload relay which relay is normally responsive to only the resistive or in phase component of the total current and is also operable by the total current in the event the total current exceeds a predetermined high value.

A still further and more limited object of this invention is to provide an overload relay of the above character particularly adapted for the testing of the insulation on electrical conductors and including means for adjusting the amount of resistive current required to trip or switch the relay.

Other objects and advantages of the invention will be apparent from the following description and from the drawings forming a part hereof.

The drawings show a peferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIGS. 2A, 3A, 4A, 5A and 6A are phasor diagrams, and 2B, 3B, 4B, 5B and 6B are corresponding vector diagrams, illustrating the phase and voltage relationships existing between various points of the circuit of FIG. 1.

Figure 1:
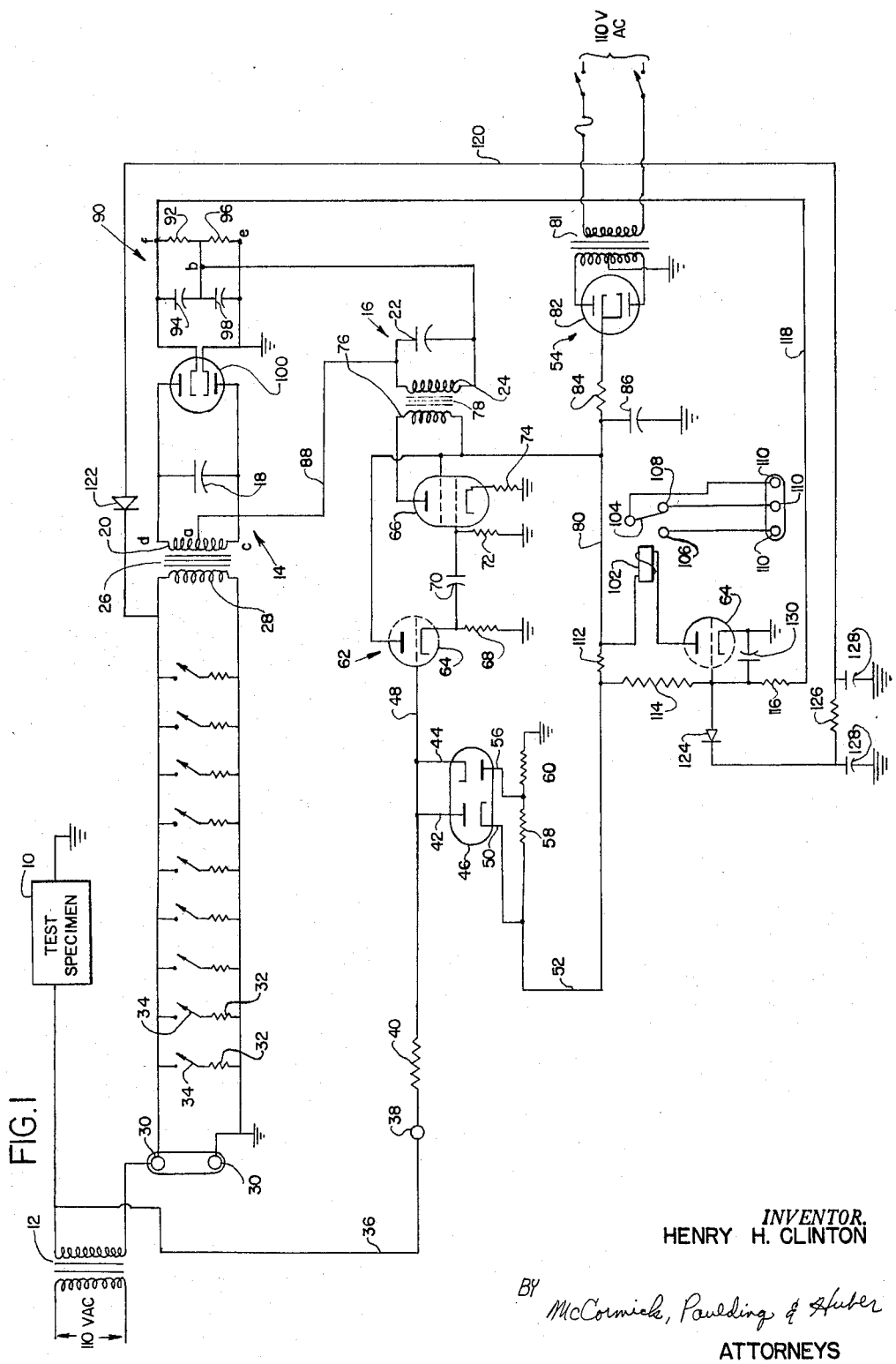
FIG. 1 illustrates diagrammatically the construction of an overload relay comprising an embodiment of the present invention.

Turning now to FIG. 1, a current sensing device embodying the invention is adapted for use with an external circuit, such as may include a test specimen, and functions to provide a voltage output signal related to the resistive component of the current passing through the external circuit or test specimen. The output voltage signal may in turn be used to operate an associated control or indicator device and preferably, and as shown, is used in conjunction with a switch or relay which is switched from one condition to another as the output voltage passes a predetermined value indicative of a maximum acceptable resistive current. The switch may in turn be used, for example, to actuate a warning device or to shut off the power to the external circuit.

For the purpose of illustration the external circuit in the present case is shown in FIG. 1 to include a test specimen 10, which for the purpose of discussion may be taken to be a reel of insulated electrical conductor immersed in water with the water forming one terminal of the specimen and one end of the conductor forming the other terminal of the specimen, the other end of the conductor being suitably insulated from the water. Current flowing through the test specimen will therefore have a capacitive reactance component due to the capacitance of the conductor, and a resistive component due to the resistance of the insulation. One terminal of the test specimen is grounded as shown and the other terminal is connected to one side of the secondary winding of a step-up transformer 12. The transformer 12 thus serves as a source of suitable high alternating voltage for the external circuit, the primary winding of the transformer being adapted for use with an applied line voltage of 110 volts A.C. or other conveniently available voltage.

Included in the illustrated device is a first means for producing an alternating voltage which oscillates in phase with the voltage applied across the test specimen 10, and a second means for producing an alternating voltage which oscillates in phase with the total current flowing through the test specimen. The voltage which oscillates in phase with the voltage across the test specimen is maintained at a constant or fixed amplitude and is used as a reference voltage. The voltage which oscillates in phase with the total current is provided with an amplitude which is directly related to the amplitude of the total current and is combined or compared with the first or reference voltage in such a manner as to produce the desired output voltage signal related to the resistive component of the total current passing through the specimen.

The means for producing the alternating voltages which respectively oscillate in phase with the voltage across and the total current through the test specimen comprise first and second tank circuits, indicated generally at 14 and 16, both of which are tuned to the frequency of the source voltage. The first tank circuit 14 includes a capacitor 18 and a center tapped inductive winding 20. The second tank circuit includes a capacitor 22 and an inductive winding 24. The first tank circuit 14 is coupled with the total current passing through the external circuit by a transformer 26, the secondary winding of which constitutes the inductive winding 20 of the tank circuit. The primary winding 28 of the transformer is in turn connected across two terminals 30, 30 adapted to be connected in series with the external circuit. In the present case one terminal 30 is grounded and the other connected to one side of the secondary winding of the transformer 12.

Also associated with the primary winding 28 of the coupling transformer 26 is a means for controlling the amount or proportion of the total current passing through such winding. This means may take various different forms, but in the present case comprises a plurality of shunt circuits each including a resistor 32 and a switch 34. In FIG. 1 all the switches 34, 34 are shown in an open condition with the result that all of the total current passes through the primary winding 28. Therefore, for a given amplitude of current a maximum voltage swing across the first tank circuit is produced. It will also be obvious, however, that by closing any one or more of the switches 34, 34 the portion of the total current passing through the primary winding 28 may be reduced to likewise reduce the voltage swing across the tank circuit produced by a given amplitude of total current. As will hereinafter be evident the switches 34, 34 therefore provide a convenient means for controlling the current sensitivity of the device.

The second tank circuit 16 is coupled with the voltage appearing across the test specimen by means of an external lead or line 36 connected at one end to the ungrounded side of the specimen and at its other end connected to a terminal 38 of the sensing device. The terminal 38 is in turn connected through a current limiting resistor 40 to the anode 42 and cathode 44 of opposite sides of a dual diode 46 which operates as a clipper to provide a doubly clipped voltage signal appearing on the line 48. The cathode 50 opposing the anode 42 is connected directly to a line 52 maintained at a positive potential by a power supply indicated generally at 54, whereas the anode 56 opposing the cathode 44 is connected to the line 52 through a resistor 58 and to ground through another resistor 60. The anode 56 is therefore maintained at a less positive potential than the cathode 50 with the result that the clipped voltage signal appearing on the line 48 has a positive D.C. reference level. This clipped voltage signal is amplified by an amplifier comprising a cathode follower stage, indicated generally at 62 and including one-half of a dual triode 64, and a second stage including a tetrode 66. The cathode of the cathode follower 62 is connected to ground through a bias resistor 68 and is coupled with the grid of the tetrode 66 through a capacitor 70 and resistor 72. The cathode of the tetrode 66 is connected to ground through a bias resistor 74. The output or load circuit of the tetrode 66 includes the primary winding 76 of a transformer 78, the secondary winding of which transformer comprises the inductive winding 24 of the second tank circuit 16. The plate supply voltage for the triode 64 and tetrode 66 is taken from the line 80 connected with the power supply 54. The latter power supply may take any convenient form and as shown consists of a transformer 81, a dual diode 82 and an associated filtering circuit comprising a resistor 84 and capacitor 86.

From the foregoing description and from FIG. 1 it will therefore be obvious that the clipping and amplifying means associated with the terminal 38 produces an alternating voltage of constant amplitude across the primary winding 76 of the transformer 78. This voltage is in phase with the voltage appearing across the test specimen 10 and by virtue of the inductive coupling with the tank circuit causes the voltage appearing across the latter tank circuit to also be in phase with the voltage across the specimen and to be maintained at constant amplitude.

One side of the second tank circuit 16 is connected to the center tap $a$ of the inductive winding 20 of the first tank circuit by a line 88. The other side of the second tank circuit 16 is connected to the second terminal $b$ of a three terminal network indicated generally at 90. The other two terminals of the three terminal network 90 are indicated at $f$ and $e$. Connected between the first terminal $f$ and the second terminal $b$ is a first filtering circuit which in the present case comprises a resistor 92 and a capacitor 94. Connected between the second terminal $b$ and the third terminal $e$ is a second filtering circuit comprising another resistor 96 and another capacitor 98. The first terminal $f$ of the three terminal network is connected with one side of the first tank circuit 14 through a diode or rectifying device which in the present case comprises one side of a dual diode 100. The other side of the first tank circuit 14 is connected to the third terminal $e$ of the three terminal network through the other side of the dual diode 100. The terminal $e$ is also grounded as shown.

The net effect of the illustrated connection between the two tank circuits, the dual diode 100 and the three terminal network 90 is to so combine the voltages across the tank circuits as to produce a signal voltage across the two resistors 92 and 96, or between the points $e$ and $f$, which signal voltage is related to the resistive component of the current flowing in the external circuit. The manner in which the voltages are combined to produce this result may best be understood by reference to FIGS. 2A to 6B. In these figures the letters $a$, $b$, $c$, $d$, $e$ and $f$ refer to the correspondingly labelled points of FIG. 1 and E$ab$ represents the voltage of point $a$ with respect to point $b$, E$ad$ represents the voltage of point $a$ with respect to point $d$, etc.

Referring first to FIGS. 2A and 2B, these figures illustrate the situation in which the current through the test specimen is purely capacitive and includes no resistive component. That is, the current through the test specimen leads the voltage thereacross by 90°. As a result of this the voltage E$ad$ appearing across the first tank circuit 14 is 90° out of phase with the voltage E$ab$ appearing across the second tank circuit. Whether E$ad$ leads or lags E$ab$ depends on the direction of the winding connection, but in the present case E$ad$ is shown to lead E$ab$. As also shown in this figure the voltage E$cd$ is equal to the voltage E$ca$ plus the voltage E$ad$, both of which latter voltages are equal to one-half of E$cd$. Therefore, as shown in FIG. 2B, the voltages E$ad$ and E$ac$ when added to the reference voltage E$ba$ provide voltages E$bd$ and E$bc$ appearing across both sides of the dual diode 100. From FIG. 2B it will be noted that the voltage E$bd$ is equal in magnitude to the voltage E$dc$ and therefore the rectified output produced by the upper side of the diode 100 and appearing across resistor 92 is equal and opposite to the rectified output produced by the lower side of the diode and appearing across the resistor 96. The voltages appearing across resistors 92 and 96 thus exactly cancel one another with the result that no output voltage signal is produced at the terminal $f$.

FIGURES 3A and 3B show the situation in which the total current is composed of both a capacitive component and a resistive component with the result that the voltage E$cd$ appearing across the first tank circuit leads the voltage E$ab$ appearing across the second tank circuit by a positive phase angle of less than 90 degrees. As a result of this it will be noted from FIG. 3B that the voltage E$bc$ appearing across the lower side of the dual diode 100 is now greater than the voltage E$bd$ appearing across the upper side of the dual diode. Consequently the voltage appearing across the resistor 96 will be greater than the voltage appearing across the resistor 92 and accordingly a negative output signal will be produced at the terminal $f$.

FIGURES 4A and 4B show the situation in which the total current is purely resistive in nature so that the voltage E$ab$ is in phase with the voltage E$cd$. From FIG. 4B it will be noted that in this situation the voltage E$bc$ appearing across the lower portion of the dual diode 100 again exceeds the voltage E$bd$ appearing across the upper portion of the dual diode with the result that the voltage across the output resistor 96 exceeds the voltage across the resistor 92 so as to produce a negative output voltage at the terminal *f*.

FIGS. 5A and 5B illustrate the situation in which the total current includes an inductive reactance component in addition to a resistive component with the result that the voltage E*ad* appearing across the first tank circuit 14 lags the voltage E*ab* appearing across the second tank circuit by a negative phase angle of less than 90 degrees. From FIG. 5B, however, it will be noted that even though the voltage E*cd* now lags rather than leads the reference voltage E*ab* the voltage E*bc* appearing across the bottom side of the dual diode 100 still exceeds the voltage E*bd* appearing across the top side of the diode with the result that the voltage across the resistor 96 again exceeds the voltage across the resistor 92 to produce a negative output signal at the terminal *f*.

FIGS. 6A and 6B illustrate the situation in which the total current is purely of an inductive reactance nature and includes no resistive component. From FIG. 6D it will be obvious that when this situation does prevail the voltages E*bc* and E*bd* appearing across the two sides of the dual diode 100 are equal with the result that the voltages across the resistors 96 and 92 are also equal so that no voltage signal appears at the terminal *f*.

From FIGS. 2A through 6B it is therefore seen that the output signal appearing at the terminal *f* is zero when the current lags the voltage by a phase angle of 90 degrees and goes negative to a maximum negative value as the phase angle decreases to zero. As the phase angle passes zero and the current starts to lead the voltage signal the output signal again rises towards zero as the phase angle increases towards 90 degrees.

It will also be understood that any current flowing through the specimen may be divided into a reactive component plus or minus 90 degrees out of phase with the applied voltage and into a resistive component in phase with the applied voltage. From FIGS. 2A, 2B, 4A, 4B, 6A and 6B it will obvious that the reactive component of the current will produce no output signal at the terminal *f* and that only the resistive component of the current will have any effect on the output signal. In other words, the voltage at the point *f* will be directly related to the resistive component of the current and any changes in the resistive component will be reflected in a change in the potential of the point *f*. Similarly, changes in the reactive component of the total current will have no effect whatsoever on the potential of the point *f*.

The voltage signal produced at the terminal *f* is used to control an associated switching circuit in such a manner that a two-position switch or other similar component of the switching circuit is switched from one state to another as the voltage signal passes a predetermined value. In the illustrated case the switching circuit includes a switch in the form of an electromechanical relay having a relay coil 102 for moving a movable contact between open and closed relationship with two fixed contacts 106 and 108. The contacts 104, 106 and 108 are connected by suitable lines to an associated group of terminals 110, 110 whereby the contacts may be wired into another external circuit for, for example, actuating an indicator or alarm, or for shutting down the power to the test specimen when the movable contact 104 moves from one fixed contact to the other. The energization of the relay coil 102 is controlled by a triode which in the illustrated case constitutes the second half of the dual triode 64. The grid of the second half of the triode 64 comprises a control terminal for the switching device and is connected to the plate supply voltage of the power supply 54 through a resistor 112 and a resistor 114 and is connected to ground through the illustrated resistor 116, the line 118 and the two resistors 92 and 96. As a result the grid is provided with a positive bias voltage and is normally conducting. When the tube is in its normal conducting state the movable contact 104 contacts the fixed contact 108 as shown. It will be noted, however, that when a negative output signal appears at the terminal *f* the potential of the grid is correspondingly reduced. That is, as the potential of the point *f* drops or becomes negative as a result of an increase in the resistive component of the total current through the test specimen the bias on the grid is driven in the negative direction. If the potential of the point *f* falls to a sufficiently negative value the associated grid of the triode 64 will be driven to such a negative value as to in turn reduce the plate current to a point at which the relay coil 102 can no longer maintain the movable contact 104 in the illustrated position. As a result the contact 104 will move into closed relationship with the contact 106 and effect a switching of the switch device.

The grid voltage of the second half of the triode may also be controlled in response to the total current in the external circuit in order to cause the switch device to switch from one state to another when the total current exceeds a predetermined value. In the present instance a voltage signal proportional to the total current in the external circuit is provided by a line 120 connected at one end to the grid of the tube and at its other end to the ungrounded side of the primary winding 28 of the transformer 26. In this manner the voltage signal applied to the grid by the line 120 is also controlled by the switches 34, 34 so that the sensitivity of the device to the total current is changed in accordance with changes in its sensitivity to the resistive component of the total current. The alternating voltage signal applied to the line 120 is rectified by two diodes 112 and 124 and filtered by a resistor 126 and two capacitors 128, 128, before reaching the grid. Any A.C. components remaining are effectively bypassed by the capacitor 130.

The invention claimed is:

1. A current overload device for use in connection with an external circuit energized by an alternating voltage source and having both resistance and reactance so that the total current therethrough leads or lags the total voltage thereacross and may be resolved into one component in phase with said total voltage and another component ninety degrees out of phase with said total voltage, said device comprising a means adapted for connection with said external circuit for producing an output voltage signal having a magnitude directly related to the magnitude of said component of said total current which is in phase with said total voltage, and a switching circuit controlled by said output voltage signal.

2. A current overload device as defined in claim 1 further characterized by said switching circuit including a vacuum tube controlled relay having a moving contact.

3. A current overload device for use in connection with an external circuit energized by an alternating voltage source and having both resistance and reactance so that the total current therethrough leads or lags the total voltage thereacross and may be resolved into one component in phase with said total voltage and another component ninety degrees out of phase with said total voltage, said device comprising a means adapted for connection with said external circuit for producing a first output voltage signal having a magnitude directly related to the magnitude of said component of said total current which is in phase with said total voltage and a second output voltage signal having a magnitude directly related to said total current passing through said external circuit, a two-position switch, and means connected with said switch and responsive to said first and second output voltage signals for switching said switch from one state to another as either one of said output voltage signals passes a predetermined value.

4. A current sensing device for use in connection with an external circuit energized by an alternating applied voltage and having both resistance and reactance so that the total current therethrough leads or lags the total voltage thereacross and may be resolved into one component in phase with said total voltage and another component ninety degrees out of phase with said total voltage, said device comprising first and second tank circuits both tuned to the frequency of said applied voltage, means coupling said first tank circuit with said external circuit so that the voltage across said first tank circuit oscillates in phase with the total current passing through said external circuit and has an amplitude related to that of said total current, means coupling said second tank circuit with said external circuit so that the voltage across said second tank circuit oscillates in phase with said applied voltage and has a fixed amplitude, said voltage across said first tank circuit therefore being capable of being resolved into one component in phase with said voltage across said second tank circuit and another component ninety degrees out of phase with said voltage across said second tank circuit and means for combining the voltages appearing across said two tank circuits in such a manner as to produce a voltage signal having a magnitude directly related to the magnitude of said component of the voltage across said first tank circuit which is in phase with the voltage across said second tank circuit.

5. A current sensing device for use in connection with an external circuit energized by an alternating applied voltage and having both resistance and reactance so that the total current therethrough leads or lags the total voltage thereacross and may be resolved into one component in phase with said total voltage and another component ninety degrees out of phase with said total voltage, said device comprising first and second tank circuits both tuned to the frequency of said voltage source, means coupling said first tank circuit with said external circuit so that the voltage across said first tank circuit oscillates in phase with the total current passing through said external circuit and has an amplitude related to that of said total current, means coupling said second tank circuit with said external circuit so that the voltage across said second tank circuit oscillates in phase with said applied voltage and has a fixed amplitude, said first tank circuit including a center-tapped inductive winding, a three terminal network including a first filtering circuit connected between the first and second terminals thereof and a second filtering circuit connected between the second and third terminals thereof, a first diode connected between one side of said first tank circuit and said first terminal of said three terminal network, a second diode connected between the other side of said first tank circuit and said third terminal of said three terminal network, and means connecting one side of said second tank circuit to the center tap of the first tank circuit inductive winding and the other side of said second tank circuit to said second terminal of said three terminal network so as to produce a rectified output voltage signal across said first and third terminals of said three terminal network having a magnitude directly related to the magnitude of said component of said total current through said external circuit which is in phase with said total voltage across said external circuit.

6. A current sensing device as defined in claim 5 further characterized by each of said filtering circuits comprising a reactor and resistor in parallel.

7. A current sensing device as defined in claim 5 further characterized by a switching circuit including a switch and a control terminal and means responsive to the voltage applied to said control terminal for switching said switch from one state to another as said latter voltage passes a predetermined value, and means connecting said third terminal of said three terminal network with said control terminal of said switching circuit whereby said switch is controlled in response to said rectified output voltage signal.

8. A current sensing device as defined in claim 7 further characterized by means for producing a second rectified voltage signal related to the total current passing through said external circuit, and means for connecting said latter means to said control terminal of said switching circuit whereby said switch is responsive to both said first mentioned and second rectified voltage signals.

9. A current sensing device as defined in claim 5 further characterized by said means for coupling said first tank circuit with said external circuit including means for selectively adjusting the amplitude of the voltage appearing across said second tank circuit produced by a given amplitude of said total current.

10. A current sensing device as defined in claim 5 further characterized by said means for coupling said first tank circuit with said external circuit including a transformer the secondary winding of which constitutes said center-tapped inductive winding of said first tank circuit, and means connecting the primary winding of said transformer with said external circuit so that at least a portion of the total current passing through said external circuit also passes through said primary winding.

11. A current sensing device as defined in claim 5 further characterized by said means for coupling said first tank circuit with said external circuit including two terminals adapted for connection in series with said external circuit, a transformer having a secondary winding which constitutes said center-tapped inductive winding of said first tank circuit and also having a primary winding connected across said latter two terminals, and a plurality of shunt circuits also connected between said latter two terminals each of which shunt circuits includes a switch in series with an impedance element whereby the amount of the total current passing through said primary winding may be selectively adjusted by operating said switches.

12. A current sensing device as defined in claim 5 further characterized by said means for coupling said second tank circuit with said voltage source comprising means adapted for connection in parallel with said applied voltage and for producing a clipped voltage signal in phase with said applied voltage, an amplifier for amplifying said clipped voltage signal, and a transformer having a primary winding connected with the output of said amplifier and a secondary winding constituting part of said second tank circuit.

13. A current sensing device as defined in claim 5 further characterized by a two-position switch, and means responsive to said rectified output voltage of said three terminal network for switching said switch from one state to another as said rectified output voltage passes a predetermined value.

14. A current sensing device as defined in claim 5 further characterized by a two-position switch, means for producing a rectified voltage signal related to the total current passing through said external circuit, and means responsive to either of said rectified voltage signals for switching said switch from one state to another as either of said signals passes a predetermined value.

References Cited by the Examiner

UNITED STATES PATENTS

| | | | |
|---|---|---|---|
| 2,280,119 | 4/1942 | Gorman et al. | 324—54 |
| 2,699,499 | 1/1955 | Jordon | 328—150 X |
| 2,984,767 | 5/1961 | Lauper | 317—27 X |

MILTON O. HIRSHFIELD, *Primary Examiner.*

SAMUEL BERNSTEIN, *Examiner.*

J. D. TRAMMELL, *Assistant Examiner.*